United States Patent
Norton, Jr.

(10) Patent No.: US 7,362,525 B2
(45) Date of Patent: Apr. 22, 2008

(54) PRML BASED MAGNETIC SERVO POSITION DEMODULATOR

(75) Inventor: David E. Norton, Jr., Boulder, CO (US)

(73) Assignee: Quantum Corporation, San Jose, CA (US)

( * ) Notice: Subject to any disclaimer, the term of this patent is extended or adjusted under 35 U.S.C. 154(b) by 242 days.

(21) Appl. No.: 11/188,199

(22) Filed: Jul. 22, 2005

(65) Prior Publication Data

US 2007/0019316 A1    Jan. 25, 2007

(51) Int. Cl.
*G11B 5/02* (2006.01)
(52) U.S. Cl. .................... 360/29; 360/51; 360/46; 360/77.12
(58) Field of Classification Search ............. None
See application file for complete search history.

(56) References Cited

U.S. PATENT DOCUMENTS

| | | | |
|---|---|---|---|
| 4,616,275 A | 10/1986 | Peeters | |
| 5,371,638 A | 12/1994 | Saliba | |
| 5,384,671 A * | 1/1995 | Fisher | ............. 360/51 |
| 5,389,671 A | 2/1995 | Felman et al. | |
| 5,452,165 A * | 9/1995 | Chen et al. | ............. 360/121 |
| 5,576,906 A | 11/1996 | Fisher et al. | |
| 5,689,384 A | 11/1997 | Albrecht et al. | |
| 5,903,404 A | 5/1999 | Tsurumi et al. | |
| 5,930,065 A | 7/1999 | Albrecht et al. | |
| 5,995,306 A | 11/1999 | Contreras et al. | |
| 6,018,434 A | 1/2000 | Saliba | |
| 6,021,013 A | 2/2000 | Albrecht et al. | |
| 6,023,386 A * | 2/2000 | Reed et al. | ............. 360/51 |
| 6,031,671 A | 2/2000 | Ayres | |
| 6,108,159 A | 8/2000 | Nute et al. | |
| 6,111,719 A | 8/2000 | Fasen | |
| 6,239,939 B1 | 5/2001 | Bui et al. | |
| 6,246,535 B1 | 6/2001 | Saliba et al. | |
| 6,266,204 B1 | 7/2001 | Nonoyama | |
| 6,282,051 B1 | 8/2001 | Albrecht et al. | |
| 6,320,719 B1 | 11/2001 | Albrecht et al. | |
| 6,327,105 B1 * | 12/2001 | DeForest | ............. 360/49 |

(Continued)

FOREIGN PATENT DOCUMENTS

EP    0690442 A2    1/1996

(Continued)

OTHER PUBLICATIONS

Abramovitch, D. Y. et al. (Jun. 1998). "Customizable Coherent Servo Demodulation for Disk Drives," *Proceedings of the American Control Conference* 5:3043-3049.

(Continued)

*Primary Examiner*—Andrea Wellington
*Assistant Examiner*—Dan I Davidson
(74) *Attorney, Agent, or Firm*—Morrison & Foerster LLP (57) ABSTRACT

Apparatuses and methods for detecting reference marks on magnetic data storage mediums are described herein. In one variation, the apparatus comprises a magnetic servo position demodulator operable to extract information from the magnetic data storage medium utilizing Partial Response/Maximum Likelihood (PRML) technique. Synchronization marks stored within the PRML channel is then detected utilizing a digital filter. For each of the detected synchronization mark, a further refined position of the synchronization mark can be determined utilizing a mathematical prediction model.

41 Claims, 8 Drawing Sheets

U.S. PATENT DOCUMENTS

| | | |
|---|---|---|
| 6,462,904 B1 | 10/2002 | Albrecht et al. |
| 6,498,695 B2 | 12/2002 | Kosugi |
| 6,512,651 B1 | 1/2003 | Eifert et al. |
| 6,542,325 B1 | 4/2003 | Molstad et al. |
| 6,580,581 B1 | 6/2003 | Bui et al. |
| 6,657,802 B1 * | 12/2003 | Ashley et al. ............... 360/51 |
| 6,721,126 B1 | 4/2004 | Bui et al. |
| 6,762,900 B2 | 7/2004 | Bui et al. |
| 6,781,778 B1 | 8/2004 | Molstad et al. |
| 6,839,196 B2 | 1/2005 | Trivedi |
| 6,842,305 B2 | 1/2005 | Molstad et al. |
| 6,999,258 B2 | 2/2006 | Molstad et al. |
| 7,002,763 B2 | 2/2006 | Bui et al. |
| 7,035,040 B2 | 4/2006 | Molstad et al. |
| 7,038,872 B2 | 5/2006 | Yip et al. |
| 7,095,583 B2 | 8/2006 | Johnson et al. |
| 7,102,847 B2 | 9/2006 | Bui et al. |
| 7,158,338 B2 | 1/2007 | Koski et al. |
| 7,245,453 B2 | 7/2007 | Koski et al. |
| 2002/0060968 A1 | 5/2002 | Senshu |
| 2002/0176200 A1 | 11/2002 | Trivedi |
| 2003/0016465 A1 | 1/2003 | Bui et al. |
| 2003/0043498 A1 | 3/2003 | Johnson et al. |
| 2003/0058562 A1 * | 3/2003 | Kuki et al. ................... 360/51 |
| 2003/0123179 A1 | 7/2003 | Molstad et al. |
| 2003/0167438 A1 | 9/2003 | Aziz |
| 2004/0223248 A1 | 11/2004 | Dugas et al. |
| 2005/0259349 A1 * | 11/2005 | Koski et al. ............. 360/77.12 |
| 2006/0044671 A1 | 3/2006 | Weber et al. |
| 2007/0064327 A1 | 3/2007 | Koski et al. |
| 2007/0070545 A1 | 3/2007 | Koski et al. |
| 2007/0121240 A1 | 5/2007 | Duran |

FOREIGN PATENT DOCUMENTS

| | | |
|---|---|---|
| EP | 1600967 A2 | 11/2005 |

OTHER PUBLICATIONS

Aziz, P. M. et al. (Nov. 2004). "Servo Signal Processing," Chapter 30. CRC Press Inc, p. 1-12.

European Search Report and European Search Opinion maield on Mar. 29, 2007 for European Application No. 06253828 filed Jul. 21, 2006, seven pages.

* cited by examiner

$$\text{offset} := \frac{Y_0 - Y_2}{2 \cdot (Y_0 + Y_2 - 2 \cdot Y_1)}$$

PRML BASED MAGNETIC SERVO POSITION DEMODULATOR

FIELD OF THE INVENTION

The invention is related generally to the field of data storage systems. In one aspect of the invention, apparatuses and methods disclosed herein can be implemented for detecting reference marks in magnetic data storage mediums.

BACKGROUND

Various data recording and recovery schemes have been developed over the years for storage of information on a magnetic medium. One example utilizes peak detection to demodulate magnetically encoded data from a magnetic storage medium. Another example utilizes Partial Response/Maximum Likelihood (PRML) detectors, which offers an improvement in signal to noise ratio (SNR) in comparison to the peak detection approach. PRML have been widely adapted in various magnetic data storage medium in recent years. However, until recently, PRML read channels have been typically constructed with an analog to digital converter (ADC) inside the timing recovery loop, resulting in a complex integration process, which has slowed the adaptation into servo demodulation applications in tape drives.

To improve data storage density and system reliability, reference marks, such as synchronization marks and position marks, have been introduced in some of the magnetic data storage medium. Although reference marks have been successfully implemented in various magnetic storage medium, detection of the precise locations of synchronization and/or position marks can be difficult.

Therefore, there is a need for an improved mechanism for the detection of reference marks. In particular, the ability to improve the resolution of reference mark detection can enhance the performance of magnetic data storage system and make possible for effective integration of additional technology features.

SUMMARY OF THE INVENTION

Disclosed herein are apparatuses and methods for detecting reference marks (e.g., synchronization marks, position marks, etc.) on magnetic storage mediums (e.g., magnetic data storage disks, magnetic data storage tapes, etc.). In one variation, the reference mark detection apparatus comprises a transducer for reading information recorded on a magnetic medium, an analog to digital converter to convert the analog signal from the transducer into a digital data stream representative of the signal read from the magnetic medium, a first digital filter for determining the sequence of bits in the digital data stream, and a second digital filter for detecting the positions (in time and/or in space) of the reference marks.

The transducer can be configured to read a plurality of channels (e.g., multiple servo tracks, etc.) on the magnetic medium. The reference marks can be located on one or more of the channels. The analog to digital converter along with the first digital filter can be configured as part of a PRML detector (e.g., a device configured for detecting partial response targets, etc.). In one variation, the first digital filter comprises a state machine, and the second digital filter comprises a peak detector (e.g., error filter, FIR window filter, etc.) and a mathematical prediction model (e.g., Lagrange interpolation equation, etc.). The peak detector is configured for determining the approximate positions of the peaks, which represent the position of the reference marks, within the corresponding analog signal. The mathematical prediction model is configured to determine a more precise position for each of the reference marks based on the peak detector output.

Another aspect of the invention includes methods for determining the position (in space and/or in time) of the reference marks within the magnetic medium. In one variation, the method comprises generating an analog signal representative of a signal recorded on a magnetic medium, converting the analog signal to a digital data stream, detecting the presence of a reference marker within the digital data stream, further determines a refined position (i.e., a position closer to the actual peak within the analog signal that represent the reference mark) of the reference mark.

In one example, the analog signal is generated by a transducer (e.g., magnetic servo read head, magneto-resistive sensor, etc.). The transducer can be configured to simultaneously read a plurality of channels on the magnetic data storage medium. In one application, the method further comprises utilizing PRML to extract data from the analog signal. The PRML method can comprise sampling the analog signal at predefined intervals utilizing an analog to digital converter, and utilizing a state machine to determine the presence or absence of a recorded signal. The sampling nature of the PRML method can lead to loss in resolution of the recorded signal being processed, and thus, making it harder to detect the precise position of the reference mark. One approach in determining a refined position of the reference mark comprises determining an approximate position of a peak in the analog signal representative of the position of the reference mark, and further determine a more precise position of the reference mark utilizing a mathematical model (e.g., Lagrange interpolation equation, etc.). The mathematical model can be utilized to predict the actual peak position within the analog signal based on the calculation of the digital data stream.

These and other embodiments, features and advantages of the present invention will become more apparent to those skilled in the art when taken with reference to the following more detailed description of the invention in conjunction with the accompanying drawings that are first briefly described.

BRIEF DESCRIPTION OF THE DRAWINGS

FIG. 12 illustrates the distribution of Sync2 mark based on a plurality (e.g., 281, etc.) of servo frames. As shown in FIG. 12, the parabolic plot comprises three discrete data sets. The "*" dot is the center of the three samples during which Sync 2 is detected, the "x" dot is the previous sample, and the "o" dot is the next sample.

DETAILED DESCRIPTION OF THE INVENTION

The following detailed description should be read with reference to the drawings, in which identical reference numbers refer to like elements throughout the different figures. The drawings, which are not necessarily to scale, depict selective embodiments and are not intended to limit the scope of the invention. The detailed description illustrates by way of example, not by way of limitation, the principles of the invention. This description will clearly enable one skilled in the art to make and use the invention, and describes several embodiments, adaptations, variations, alternatives and uses of the invention, including what is presently believed to be the best mode of carrying out the invention.

PRML based magnetic servo position demodulator is used herein as an example application of the reference mark detection apparatus, in order to illustrate the various aspects of the invention disclosed herein. In light of the disclosure herein, one of ordinary skill in the art would appreciate that the methods and apparatuses disclosed herein can be implemented in various other magnetic storage systems for determining and/or calculating the position of the reference marks within their corresponding magnetic storage mediums. Furthermore, it is intended that PRML as used herein includes Extended PRML (EPRML), other variations of PRML that are well known to one of ordinary skill in the art, and improvements which are derived from traditional PRML methods.

It must also be noted that, as used in this specification and the appended claims, the singular forms "a," "an" and "the" include plural referents unless the context clearly dictates otherwise. Thus, for example, the term "a read head" is intended to mean a single read head or a combination of read heads, "an electrical signal" is intended to mean one or more electrical signals, or a modulation thereof.

Figure 1A:
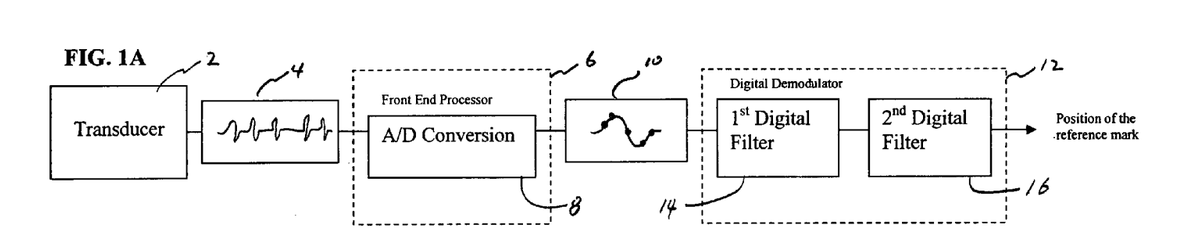
FIG. 1A illustrates a variation of a reference mark detection apparatus.

One variation of a reference mark detection apparatus is shown in FIG. 1A. The apparatus includes a transducer 2 (e.g., magneto-resistive sensor, etc.) for detecting magnetic flux on a magnetic data storage medium. The transducer generates an analog electrical signal 4, which feeds into the front end processor 6. The front end processor 6 includes an analog to digital (A/D) converter 8, which samples the analog signal 4 coming from the transducer 2 (i.e., the partial response component) and generated a series of digital data stream 10 (shown as discrete dots on the curve) representative of the analog signal. A digital demodulator receives the digital data stream 10 and utilizes a first digital filter 14 to determine the most likely sequence of bits this digital data stream represents (i.e., maximum likelihood). In one variation, the A/D converter and the first digital filter is configured as part of a PRML detector. A second digital filter 16 is then utilized to locate the position of the reference mark. The output of the digital demodulator 12 includes information related to the position of the reference mark. This information may be in the form of location information, timing information, or correction information (e.g., error or offset to calculate the position of the reference mark).

Figures 1B, 2A:
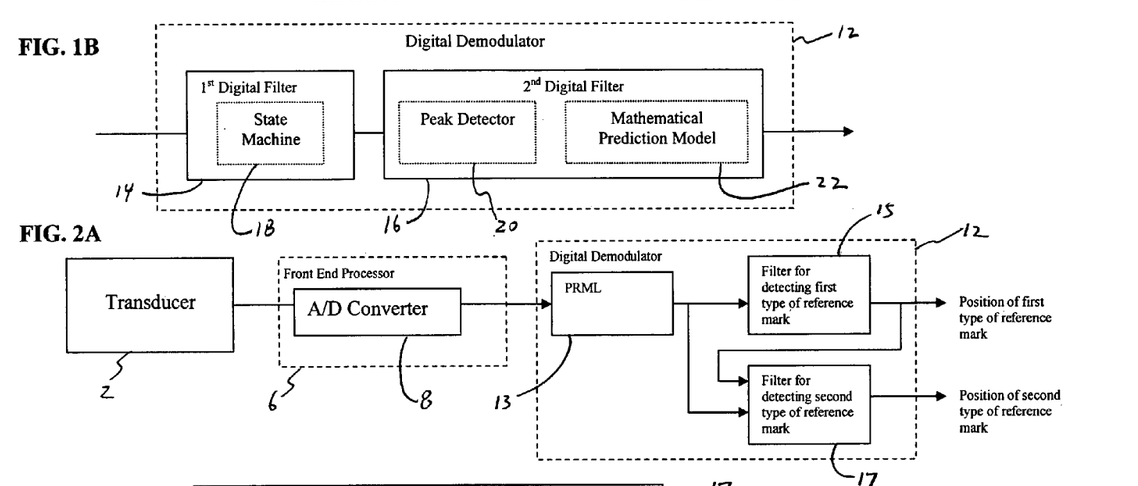
FIG. 1B illustrates a variation of a digital demodulator for implementation in the reference mark apparatus shown in FIG. 1A.
FIG. 2A illustrates another variation of a reference mark detection apparatus having filters configured to detect two types of reference marks.

Referring to FIG. 1B, one variation of a digital demodulator 12 is illustrated in detail. In this variation, the first digital filter 14 comprises a state machine 18 for converting the digital data stream into corresponding bits representing the data, information, and/or reference marks encoded on the magnetic medium. The second digital filter 16 comprises a peak detector 20 (which may include an error filter, a FIR window filter, or a combination of digital filters, etc.) for locating the approximate position corresponding to a peak in the analog signal that represents the reference mark. A mathematical prediction model 22, such as an equation derived from an interpolation equation representative of the probabilistic distribution of the reference mark position, is then utilized to determine a refined position of the reference mark based on the approximation determined by the peak detector.

FIG. 2A illustrates another variation of a reference mark detection apparatus. In this particular design, the asynchronously sampled digital data stream from the front end processor 6, is first recovered into synchronous level samples and the underlying digital data by the PRML block 13 in the digital demodulator 12. The digital data is then processed by a digital filter 15 configured for detecting a first type of reference mark (e.g. Sync1 mark). Recovery of a first type of reference mark (e.g., Sync 1), then enables operation of another digital filter 17 configured for detecting a second type of reference mark (e.g., Sync2 mark), which compares the level samples with a reference to determine the position of least error in order to identify the presence of a second type of reference mark (e.g., Sync2 mark). Additionally, detection of a first type of reference mark (e.g., Sync1 mark) starts a counter; the operation of the counter is suspended once a second type of reference mark (e.g., Sync2 mark) is identified. This count forms the basis of a distance measurement from the position of a first type of reference mark (e.g., Sync1 mark) to the position of a corresponding second type of reference mark (e.g., Sync2 mark), a value whose resolution is improved by operation of a mathematical prediction model 23 in the filter 17 for detecting a second type of reference mark.

Figure 2B:
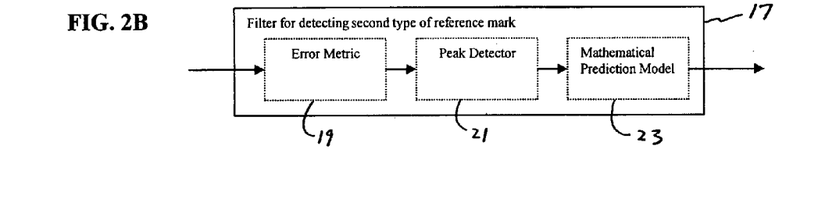
FIG. 2B illustrates one variation of a filter for detecting a second type of reference mark. The filter can be implemented in the reference mark detection apparatus shown in FIG. 2A.

Referring to FIG. 2B, one implementation of a digital filter 17 for detecting a second type of reference mark is illustrated. An error metric function 19 (e.g., window filter, FIR filter, etc.) makes use of a reference copy of the second type of reference mark (e.g., an ideal/preferred Sync2 mark), and measures the quality of the match between the input sampled digital data stream and this reference. In one variation, this error metric calculation takes the form of an absolute error squared calculation, where the absolute error between each sample and its corresponding reference sample is calculated. The resulting error terms are then summed together, and the result squared. It should be noted that the digital filter for detecting second type of reference mark 17 is not limited to utilizing this specific error metric calculation. One of ordinary skill in the art having the benefit of this disclosure would appreciate that other suitable calculations can also be implemented to achieve the same task.

The next stage in the filter for detecting second type of reference mark 17 is the peak detector 21. As the input digital data stream more closely matches the reference samples, the output of the error metric 19 will reach a minimum, after which as the match between the data stream and the samples degrades, this output will again increases. The peak detector 21 is configured to detect the presence of this negative peak, which corresponds to an approximate position of a second type of reference mark (e.g., Sync2 mark). The final block in the filter for detecting second type of reference mark 17 is a mathematical prediction model 23 that makes use of the samples in the peak detector 21, when a negative peak is detected, to estimate the phase relationship between the second type of reference mark (e.g., Sync2 mark) and the underlying tone and the first type of reference mark's pattern (e.g., Sync 1 pattern). This phase estimate is then utilized to improve the resolution of the distance measurement between the first type of reference marks (e.g., Sync1 marks) and their corresponding second type of reference marks (e.g., Sync2 marks).

In another example, the reference detection apparatus is configured as a servo demodulator with a PRML channel for detecting reference marks on a magnetic data storage tape. In one variation, reference marks, in the form of synchronization marks, are provided on the magnetic tape in the tape drive to allow the magnetic servo demodulator to detect the servo demodulator's position relative to the magnetic tape. In one application, pairs of synchronization marks (e.g., Sync1 and Sync2) are placed along the length of the magnetic tape to define individual frames on the magnetic tape. By reading the position of the corresponding pairs of synchronization marks (Sync1 and Sync2) and calculating the distance between them, the servo demodulator can then determine the position of servo head relative to the magnetic tape.

Figure 3:
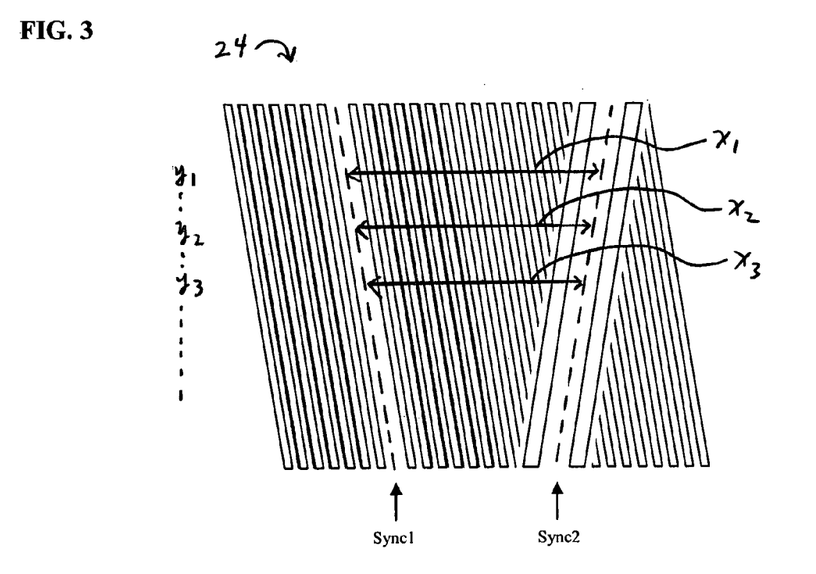
FIG. 3 illustrates an example of a servo track with synchronization marks.

An example of a servo track 24 with synchronization marks (Sync1, Sync2) is shown in FIG. 3. When the servo read head is located at position "y1" the distance between Sync1 and Sync2 is "x1". When the servo read head is located in position "y2" the distance between Sync1 and Sync2 is "x2", and so forth. As shown in FIG. 3, when the servo read head is displaced laterally (e.g., from y1 to y2) relative to the length of the tape, the distance between the pair of synchronization marks will vary (e.g., x1>x2), thus, allowing the magnetic servo demodulator to determine its position relative to the tape position based on the distance between each pairs of synchronization marks.

Figure 4:
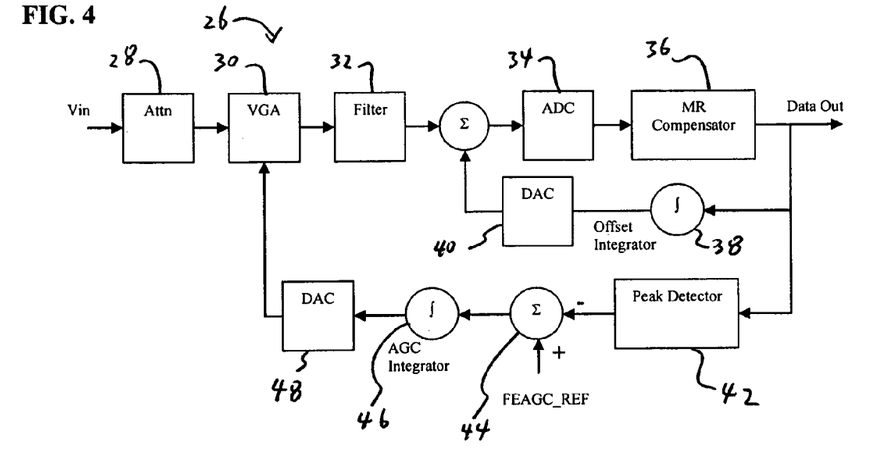
FIG. 4 illustrates a front end processor for one variation of a PRML based magnetic servo demodulator configured to detect reference marks.

In one variation, the servo demodulator is broken up into two distinct functions. The first is a front end processor (FEP) 26, whose purpose includes amplitude normalization, filtering, providing magnetic read (MR) head non-linearity compensation, and converting the analog signal into the digital domain. The FEP converts the input voltage waveform into a digital representation. As shown in FIG. 4, the functions contained in the FEP 26 includes: an attenuator (Attn) 28 for providing coarse gain control, a variable gain amplifier (VGA) 30 for use in normalizing the input signal to the analog to digital converter (ADC) dynamic range, an anti-alias/equalization analog filter 32, an ADC 34, and the MR non-linearity compensation 36. Also contained in the FEP is an offset control loop which removes direct current (DC) offset from the output, as application of the MR non-linearity correction can alter the DC content. Within the offset control loop is an integrator 38, which sets the bandwidth of this loop. A digital to analog converter (DAC) 40 is provided to generate an analog electrical signal to modify the filter 32 output. Additionally an AGC (Automatic Gain Control) control loop for normalizing the output level is included. The AGC control loop contains an amplitude detector 42 for measuring the peak to peak output of the FEP, a difference stage where the amplitude of the signal is compared with the reference (FEAGC_REF), an integrator 46, again used to set the bandwidth of the control loop, and lastly a digital to analog converter (DAC) 48 for control of the VGA gain.

As one of ordinary skill in the art having the benefit of this disclosure would appreciate, the functionality of the above described FEP is similar to the AFE (Analog Front End) functions contained in various read channel designs commonly used in data storage drives. One of ordinary skill in the art having the benefit of this disclosure would appreciate that there are various methods to implement the FEP functionality described herein.

Figure 5:
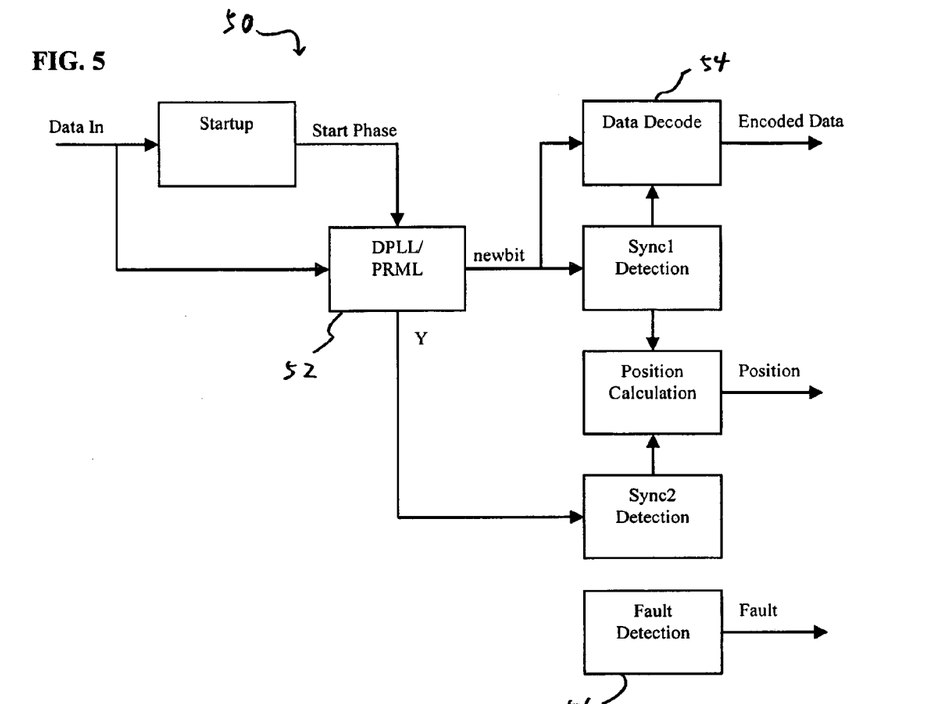
FIG. 5 illustrates a digital demodulator configured to processes the data provided by the front end processor of FIG. 4.

The second functional block is the digital demodulator 50. The purpose of this function is to demodulate the samples supplied from the FEP 26. As shown in FIG. 4, the digital demodulator comprises a Digital Phase Locked Loop (DPLL) 52, the basis of which is a PRML channel. In one variation, the digital demodulator 50 also contains functions 54 to decode the data encoded into the servo track (e.g., band number, position down the tape, manufacturer's information, etc.), as well as measuring the position of the magnetic read head. In another variation, a fault sense function 56 is also incorporated into the digital demodulator 50.

In this example, a PR4 partial response target is utilized. This configuration, which implements a simple partial response target, may be particularly useful in applications where the data on the servo track is written at a lower density than is the data stored on the other tracks on the tape drive (e.g., customer data).

Figure 6:
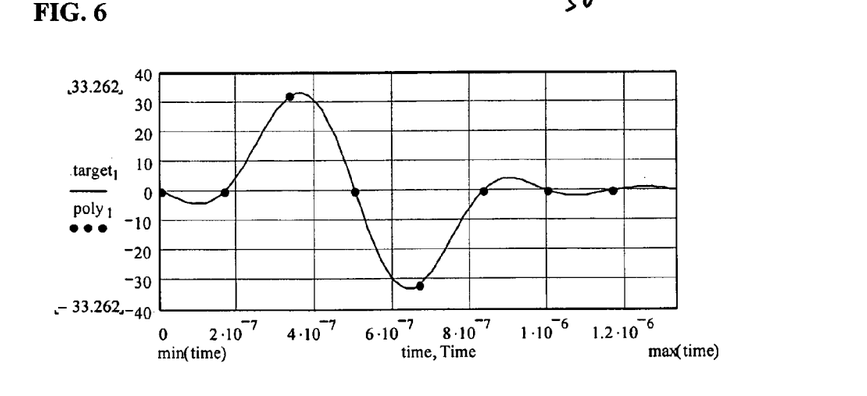
FIG. 6 is a time domain plot illustrating the response of a PR4 target. The finite dots on the continuous curve illustrate the data sampling points.

The time domain step response for the PR4 target is (1, 1). This equates to a di-bit (or impulse) target of (1, 0, −1). In one variation, the target has been scaled to fit an 8-bit ADC, resulting in a target of (32, 0, −32). FIG. 6 illustrates the time domain response of the PR4 target. Note that this plot is of the di-bit target, and these values have been scaled to fit an 8-bit ADC, and they have additionally been zero filled on the ends. The dots on the continuous trace represent the bit locations. One of ordinary skill in the art having the benefit of this disclosure would appreciate that other partial response targets (e.g., EPR4, $E^2$PR4, NPR, etc.) may also be implemented in the reference mark detection apparatus.

Figure 7:
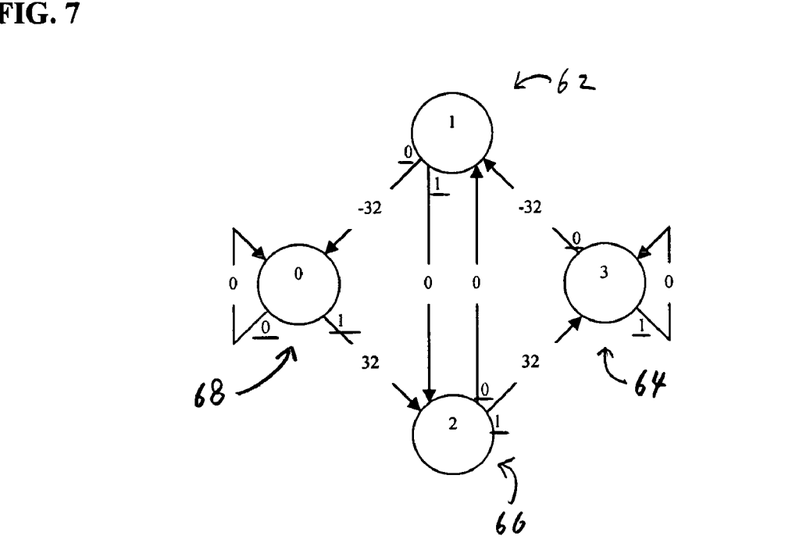
FIG. 7 illustrates a state diagram from a PR4 target.

A state machine is then implemented to map the partial response target. In one variation, a modified Viterbi detector is utilized to locate the most probable path though the state space formed by the target. The state diagram for a PR4 target (with scaled levels) is shown in FIG. 7. Each of the circles 62, 64, 66, 68 is a possible state that the data could be in. The name of the state is the history into the state expressed in binary if the least significant bit is the oldest data. For example, all paths into state 0 (00 binary) require two consecutive zeros. Note that the state name is arbitrary; this definition is chosen for convenience. The underlined numbers (i.e., 0 and 1) directly adjoining each arrow are the digital data required to traverse that path, which is to say, if a specific path is chosen as the most probable, the underlined bit will be reproduced as the output. Finally, the number on the path (i.e., 32, −32, and 0) are the analog value nominally encountered when the input data traverses the path, and is the value compared with the actual sample to determine if a specific path is the most probable one.

One additional ramification of this particular implementation of PR4 is the number of bits present in the tone field. In PRML, as for various other practical targets, the one-zero pattern (1T) has little or no output. The first run length with a significant output is the one-one-zero-zero (2T) pattern. In PR4 application, a minor gain change can lead to one of three paths through the trellis. The first is the intended path of states 0-2-3-1, which produces a 32, 32, −32, −32 output. Other paths that can produce this result are 2-3-3-2-1 which produces 32, 0, −32, 0, and 0-2-1-0 which produces 32, 0, −32, 0. Note that both of the alternative values occur at a phase offset of half a bit cell with just a small gain error (the peak value of the analog samples move from about 34 down to 32). As a consequence, the 2T pattern can have an ambiguous phase, and having a large content of it, such as the base tone in the servo frame, is best avoided.

Therefore, in one variation, the base tone field of the servo pattern is defined as a 3T (three ones followed by three zeros producing a 32, 32, 0, −32, −32, 0), as there are no ambiguous phase and no gain offsets that may be mistaken for this result. This also leads to an easy path to supply the phase encoding specified in the pattern application: if an encoded bit is a "zero" the tone field is left unaltered; if it is a "one", the tone field is modified to four ones followed by two zeros. The bit in the forth position contains the encoded bit.

Another departure from the classic Viterbi detector is that the state machine in this example is configured without the path memory. Rather than use of a path memory to converge the most likely state, and hence the digital output, the digital output is obtained by using the best state estimate that is being used to drive the DPLL.

This configuration allows the device to obtain the location of the first synchronization mark as soon as possible, and avoid the latency caused by the presence of a path memory. As a consequence, the samples after a given bit location will not effect the outcome of that specific bit. However, the most likely path into a given state is still being used. This design may permit simpler circuit implementation to support the functionalities. An example showing detailed mechanisms contained in a magnetic servo pattern is disclosed in U.S. patent application Ser. No. 10/854,078, entitled "SERVO TRACK HAVING PERIODIC FRAMES OF TONE FIELD AND EMBEDDED SYNCHRONIZATION MARKS" filed May 24, 2004, which is incorporated herein by reference in its entirety for all purposes.

As discussed early, in this example, there are two types of synchronization marks (i.e., Sync1 and Sync2). The function served by each type of synchronization mark is different. The first mark, denoted Sync1, is contained in the base tone. The decoding of this mark is done in the synchronous domain by observing the bit pattern decoded from the tape. Note that when the expected bit pattern for Sync1 is read, a distance measurement is started, and detection of the second sync mark will stop this distance measurement. The second mark, denoted Sync2, is decoded in an asynchronous fashion, as it is seldom in phase with the base tone. Since Sync1 is decoded in a synchronous fashion, a very simple mark will suffice, and for this particular variation of demodulator, a 9T length is implemented, where the tone spacing is 3T (i.e., three tone lengths was chosen). A more complex mark, because of the asynchronous decoding, was chosen for Sync2. This mark is formed from a 3-6-12-6-3 T pattern. Note that the 3Ts on either end of Sync2 are not considered part of the mark for the detection process: because Sync2 over-writes the tone field, there are points of constructive and destructive interference on either end of the mark, the end result being an uncertainty of the run lengths at these positions. The extra 3T lengths at either end of the mark serves as guard bands, guarantying the integrity of the 6T spaces.

The two sync marks have the following characteristic: the first sync mark is one third of the tone field, implying that the third harmonic of the first sync mark is the tone. The second sync mark on the other hand is constructed of one half and one forth of the tone field, hence the second and forth harmonics of the mark are tone. This can be significant in certain applications, since odd harmonics exist in long run lengths, and an effort may be made in the MR head compensation within the FEP to minimize the even harmonic content. Hence, from a standpoint of frequency content, Sync1 is designed to appear similar to the base tone, whereas Sync2 is designed to maximize the difference in frequency content from Sync1 and the base tone. This configuration may allow one to improve the probability of detecting Sync2, and at the same time minimize the probability of false-positive detection.

Figure 8A:
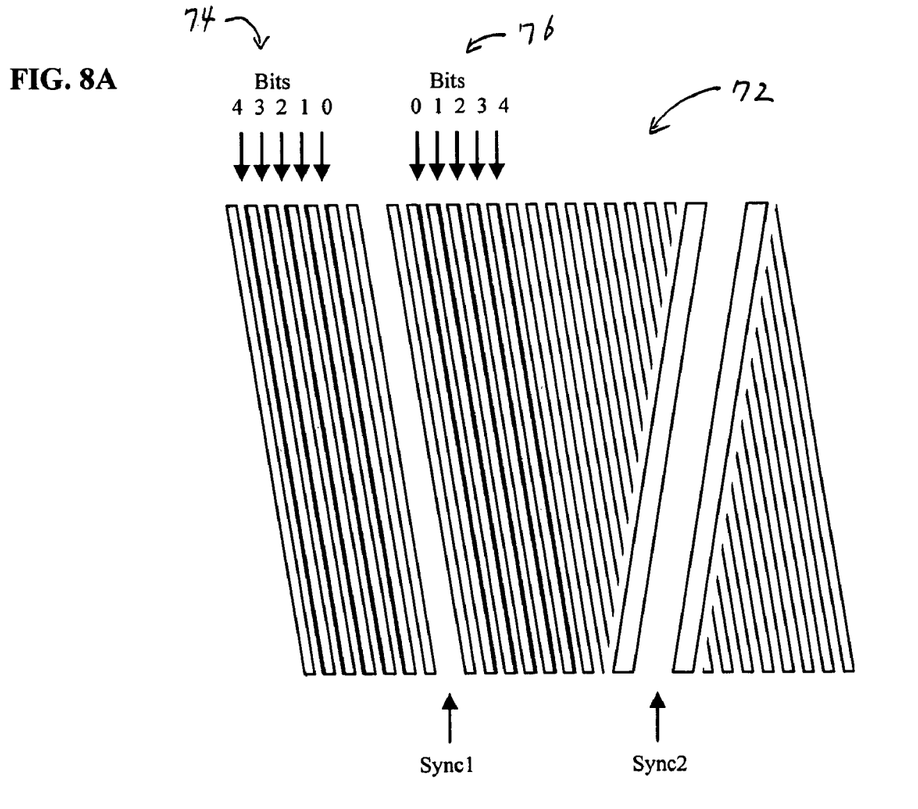
FIG. 8A illustrates a servo frame located on a magnetic tape.

FIG. 8A illustrates an example of a servo frame 72 including the two synchronization marks (Sync1, Sync2), as well as the encoded data. In this figure, 5 bits per frame of encoded data are defined. One of ordinary skill in the art would appreciate that this is not a requirement, and any number of bits may be encoded. The number of bits specified here is only intended as an illustration. Note also that each of the bits is instantiated into two locations 74, 76. The second set of five bits 76 are placed in a reversed order in comparison to the first set of five bits 74, such that servo frame may be read in either direction without re-configuring the demodulator. One of ordinary skill in the art would appreciate that this is not a requirement, and it is done to simplify the illustration.

Figure 8B:
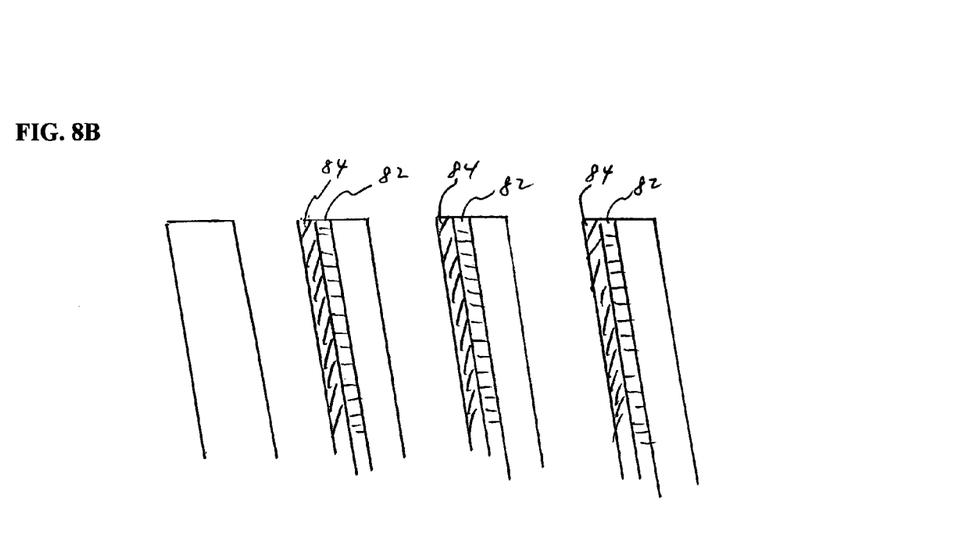
FIG. 8B illustrates an expanded view of the servo frame of FIG. 8A, showing the recording position for corresponding "1" and "0".

FIG. 8B is an expanded view of FIG. 8A, showing the locations where "0" and "1" are encoded in each bit. Within each bit location, there is a Zero position 82 and a One position 84. FIG. 8B illustrates the Zero and One position pattern for bits 74 located to the left of the Sync1 mark of FIG. 8A, where One position 84 is positioned on the left side of the corresponding Zero position 82 for each bit. For the complementary bits 76 located to the right of Sync1 mark, the pattern is reversed (i.e., the Zero and One position pattern is a mirror image across Sync1), where the Zero position is placed on the left side of corresponding One position for each bit. For each of the bits, if the Zero position 82 is encoded, that would indicate that the particular bit is "0". If the One position 84 is encoded, that would indicate that the particular bit is "1". In one variation, additional tone cycles are added, making the frame longer.

Figure 9:
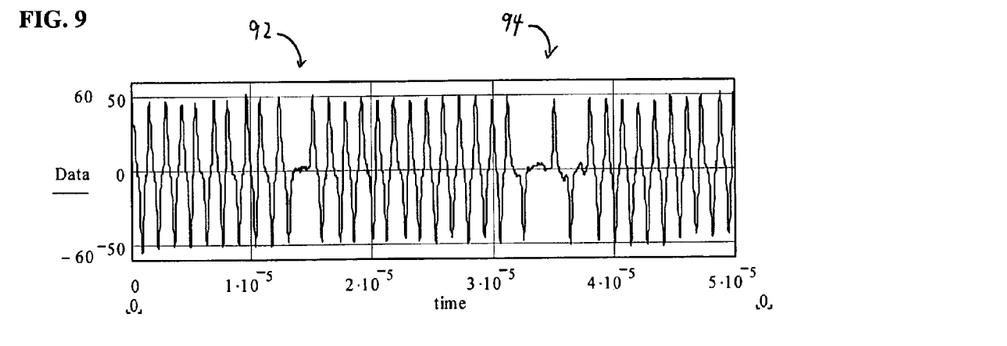
FIG. 9 illustrates the analog signal of the servo head output from reading a servo frame on a magnetic medium.

FIG. 9 shows the analog signal representing the transducer output of the servo read head from reading a servo frame on the magnetic tape. The Sync1 mark 92 is at 14 µsec. The Sync2 mark 94 is centered about 34 µsec. Close examination of the waveform encoding the data will show that the zeros have a symmetrical shape, whereas the ones have a more pronounced flat portion of the right hand side of the positive pulses.

As was noted above, the Sync2 mark is detected in an asynchronous fashion. This can be done by using a peak detector, such as an error filter. Other digital filters may also be implemented to detect the approximate position of the peak in the waveform that represents the position of Sync2. In one variation, this is accomplished by storing the magnitude samples from the state machine (e.g., Viterbi detector, etc.) and comparing them with an ideal (reference) copy of the Sync2 mark. In this particular example, the following reference (i.e., ideal copy of the Sync2 mark) is utilized: (32, 32, 0, 0, 0, 0, −32, −32, 0, 0, 0, 0, 0, 0, 0, 0, 0, 32, 32, 0, 0, 0, 0, −32, −32).

Figure 10:
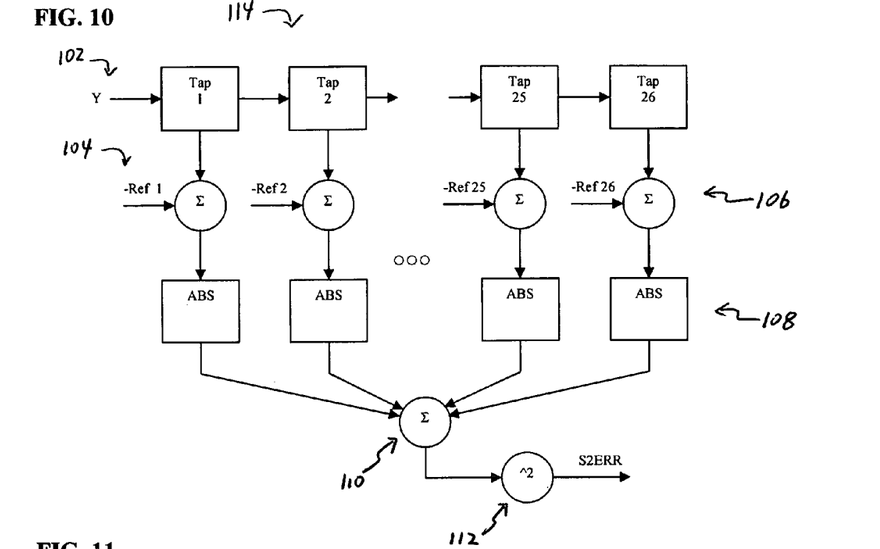
FIG. 10 illustrates an example of an error calculation circuit configured for detection of a reference mark (e.g., Sync2). The Y input of this circuit is the interpolated magnitude sample from the DPLL shown in FIG. 5.

This comparison can be done using an absolute error squared metric, such that each sample 102 is compared with the corresponding sample in the reference 104, a difference 106 is generated, the absolute value 108 of the difference is summed together 110, the result of this sum is squared 112, and then presented as the error (e.g., S2ERR). There are other forms of the calculation that are applicable (such as squaring the difference rather than taking the absolute, then summing the squares). However, this particular implementation (i.e., utilizing absolute error squared metric) can be implemented with limited hardware. The result of this calculation is that, as the channel samples better match the reference, the output of the error function varies in the form of an up facing parabola, where the point of best match is the vertex of the parabola. FIG. 10 shows the absolute error squared metric implemented in a circuit 114.

Figure 11:
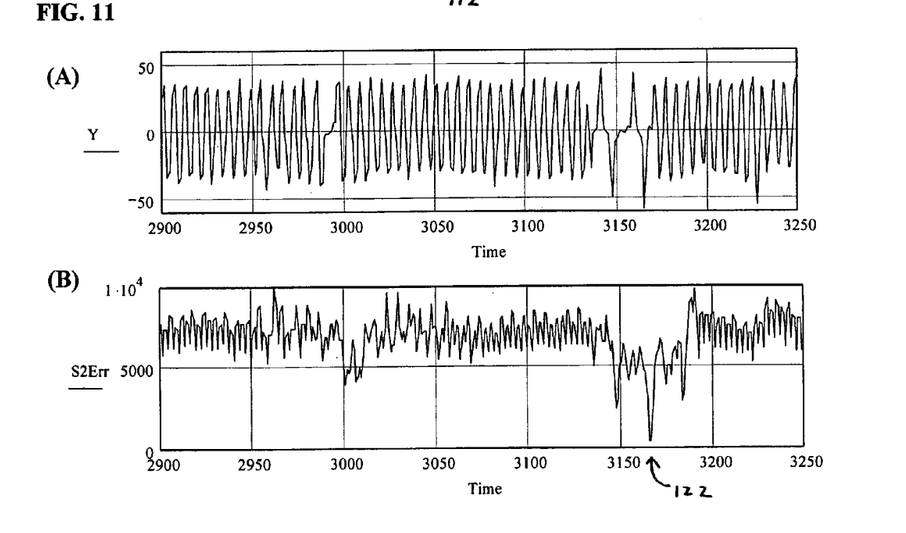
FIG. 11A illustrates the Y input in the time domain.
FIG. 11B illustrates the corresponding S2Err output regenerated by the error calculation circuited as the result of the input shown in FIG. 11A.

The Y input to this circuit is the interpolated magnitude samples from the DPLL, as shown in FIG. 11A. The vertical scale is bits, the horizontal scale is the sample number of the original scope capture. The Sync2 error output as a function of the Y samples is shown in FIG. 11B. The vertical scale is bits, and the horizontal scale is the sample number. The position of the Sync2 mark is located around a sharp negative peak 122, present in the Sync2 error value trace. The ideal copy of the Sync2 mark serves as a window filter. The out put of the filter (i.e., S2Err) indicates whether there is a close match. When the output of the filter approaches zero, this indicates that a close match to the reference has been obtained. The negative peak 122, which is closest to zero, indicates the approximate position of the Sync2 mark. This negative peak is on the order of five channel samples long, with the three samples in the center inscribing a parabola.

To detect the Sync2 mark a delta detector is employed which looks for the center of three consecutive samples to be less than the samples on the ends. Additionally this center sample must be below an absolute threshold. When both of these conditions are met a Sync2 mark detection is declared, and the distance measurement that was started when Sync1 was detected is stopped. The issue with this distance measurement between Sync1 and Sync2 is that since the length of the bits on the tape is fairly long, it still has a very poor resolution: if a 1micron tone space is assumed the resolution of this measurement is going to be on the order of 1.05 microns, clearly much higher than the 1/30 of a micron desired in many applications.

Figure 12:
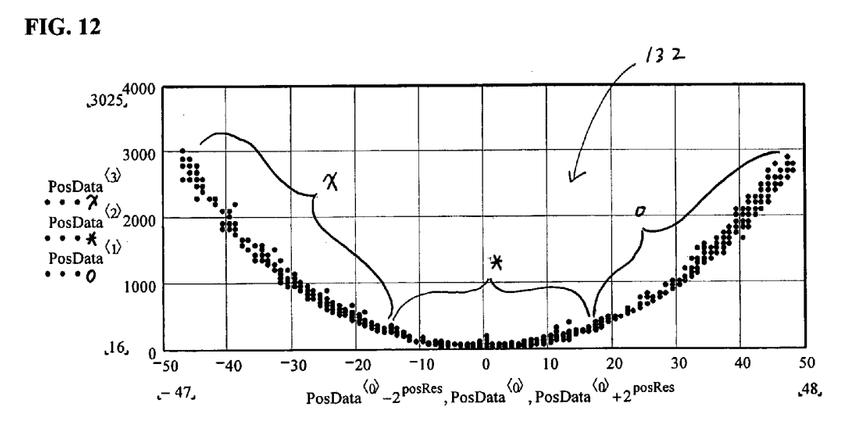

The parabolic characteristic of the Sync2 error calculation is illustrated in FIG. 12. Data from a plurality of servo frames (e.g. 281 servo frames) are superimposed over each other to form the distribution pattern 132 shown in FIG. 12, which illustrates the parabolic nature of the Sync2 error distribution. The horizontal scale is the phase offset between the Sync2 mark and the base tone where 32 counts is equal to a single clock servo bit clock period. This plot can be constructed by placing the vertex of all the sample data sets (e.g., all 281 of them) at zero. The vertical scale is bits, and corresponds to the result of the Sync2 error calculation. Note that there are three discrete data sets here: a "*" dot is the center of the three samples during which Sync2 was detected; whereas a "x" dot is the previous sample; and a "o" dot is the next sample. The compilation of these data sets shows a parabola type distribution.

Figure 13:
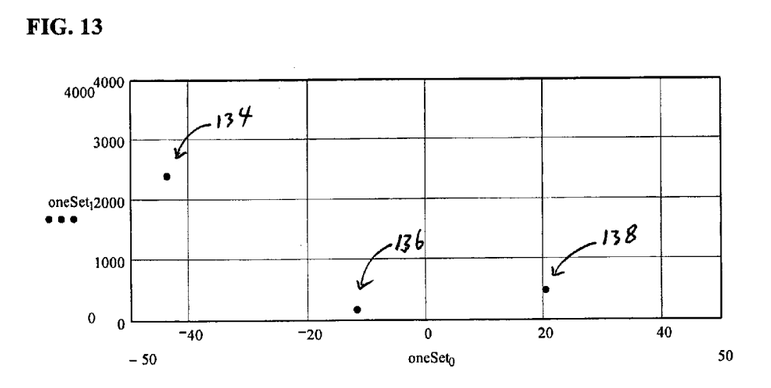
FIG. 13 illustrates one discrete set of sample for a single servo frame.

To further improve the resolution of the Sync2 mark detection, thus, improving the accuracy of the detected position versus the actual position of the Sync2 mark, one can rely on the Sync2 mark error distribution pattern to calculate a refined position for the Sync2 mark. As noted above, the form of the error function of the Sync2 is a parabola. However, in most situations the vertex of that parabola is not one of the sampled points. FIG. 13 illustrates a discrete set of samples from a single servo frame. For this plot the three points 134, 136, 138 define a parabola with the vertex at zero. These sample points are phase locked to the base tone (update to the DPLL is suspended during the Sync2 mark detection cycle, so that the phase offset between the base tone and the Sync2 will not alter the measurement). Note that none of the points 134, 136, 138 in FIG. 13 is the vertex. The task of the interpolator is to determine the position of the vertex, and hence the offset between the Sync2 and the base tone.

Interpolation based on the three data points is then utilized to calculate the position of the vertex. Since the form of the parabola is a second order equation, one may utilize the Lagrange interpolation equation for a second order polynomial to determine the vertex. The Lagrange interpolation equation is differentiated, and then solved for the point for which the slope is zero, which corresponds to the location of the vertex. The resulting equation is:

$$\text{Offset} := (Y_0 - Y_2)/[2*(Y_0 + Y_2 - 2*Y_1)]$$

Figure 14:
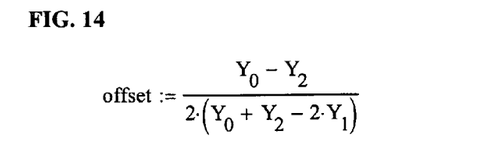
FIG. 14 shows an equation derived from the Lagrange interpolation equation for a second order polynomial. The solution of the Lagrange interpolation equation provides the offset for adjusting the position of the Sync2 market.

This equation is also shown in FIG. 14. $Y_0$ is the last of the three samples, $Y_2$ is the first, and $Y_1$ is the center, and lowest of the three samples. This equation is normalized to servo bit period of one, producing a result that varies from −0.5 to 0.5, which is simply added to the number of servo bit clocks measured so as to determine the final distance between the two Sync marks.

In one variation, the above reference mark detection apparatus is implemented to allow a system to sample the analog single from the transducer at a lower frequency, while obtaining a reference mark determination with accuracy that is similar to a higher resolution system. For example, the apparatus may have a sample rate of 50 MHz while obtaining a position calculation for the reference mark with a resolution similar to 284 MHz.

In another variation, the reference mark detection apparatus is implanted to achieve noise suppression. For example, approximately 2-dB improvement over peak detection method may be achieved by implementing a PRML channel. Furthermore, unlike designs which measures time between discrete peaks of the servo data, the reference mark detection apparatus can be configured to measure distance. In one variation, the measurement is averaged over multiple samples, improving the SNR (Signal to Noise Ratio). In the case of the Sync1 mark detection, the averaging can be a result of the DPLL, and the distance count is started from the point that the DPLL locates Sync1, not from a single bit location. The improvement in SNR in this case is a function of the DPLL bandwidth, which can be about 1.5% of the bit rate, resulting in an SNR improvement on the order of 15-dB. In the case of Sync2, the improvement can be a function of the number of magnitude samples contained in the error detection. For an implementation with 26 samples, an improvement in SNR on the order of 14-dB can be achieved.

Figure 15A:
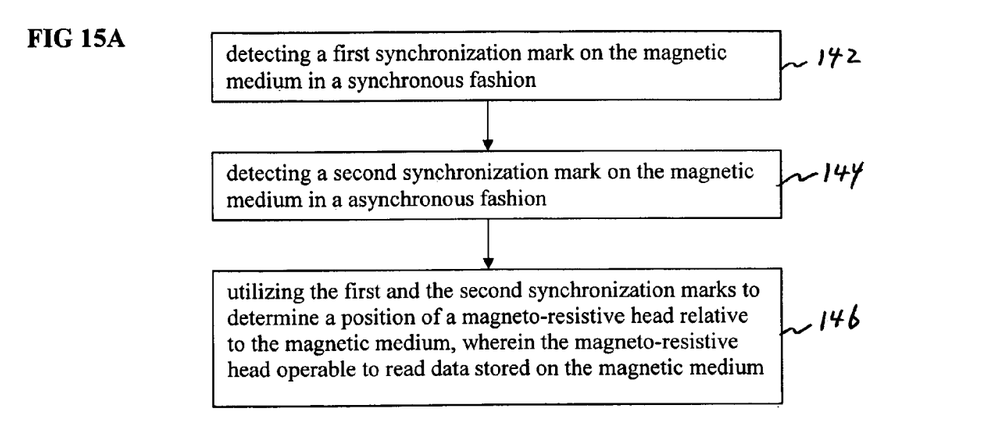
FIG. 15A illustrates one example of a method for determining the position of reference marks on a magnetic medium.

In view of the discussion above, one of ordinary skill in the art would appreciate that the methods for determining reference marks as described above can be implemented in various other hardware and/or software configurations, and these methods are not limited to the particular device configuration described above. FIG. 15A illustrates an exemplary method for reference mark detection. In this example, the first synchronization mark is detected synchronously 142, while the second synchronization mark is detected asynchronously 144. In one variation, the PRML method is utilized to detect the first synchronization mark, while PRML method in combination with error adjustment is utilized to calculate the second synchronization mark (e.g., determining an approximate position of the second synchronization mark and then calculate an offset to correct the error). Interpolation can also be utilized to determine the final position of the second synchronization mark. In another variation, the second synchronization mark is calculated based on the variability of a position of the second synchronization mark relative to the based tone. The first and the second synchronization mark can then be utilized to determine a position of a magneto-resistive read head relative to the magnetic medium where data are stored 146.

Figure 15B:
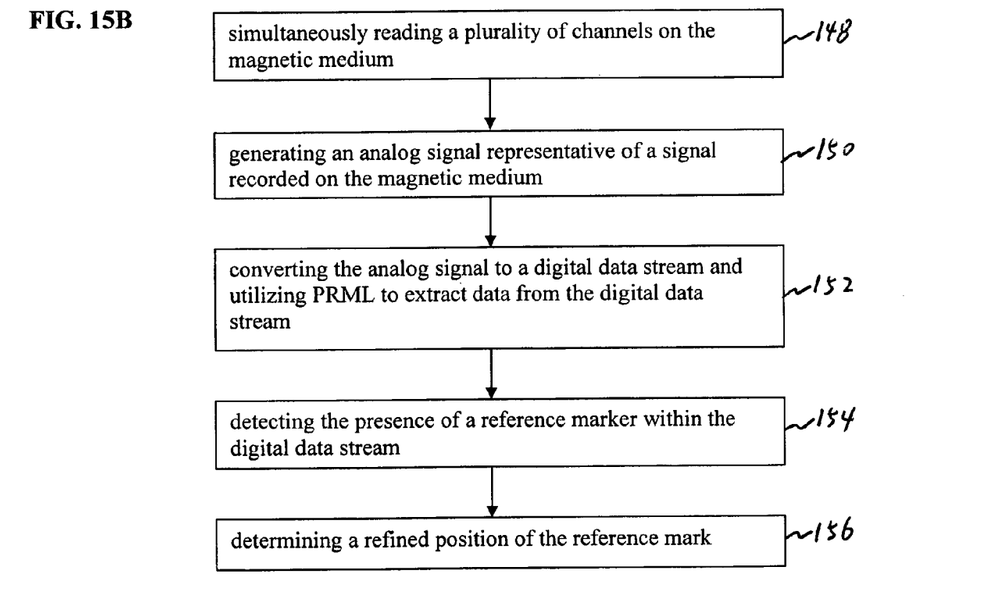
FIG. 15B illustrates yet another variation of a method for determining the position of the reference marks.

Another variation of a method for determining the position of the reference mark is illustrated in FIG. 15B. A transducer is used to read information recorded on a data storage medium. In one variation, the transducer is configured to simultaneously read a plurality of channels/tracks on the data storage medium 148. The analog signal 150 from the transducer is then converted to a digital data stream 152. A first digital filter is used to detect the reference mark (e.g., Sync2) in the digital data stream 154, and then a second digital filter is used to refine the detected position of the reference mark 156. In one variation, the first digital filter comprises a state machine, while the second digital filter comprises a peak detector. The peak detector may be adapted to calculate an approximate position of the peak in the analog signal that represents the reference mark. In another variation, the second digital filter may further comprise a mathematical prediction model to predict the actual position of the reference mark.

One of ordinary skill in the art having the benefit of this disclosure would also appreciate that the position detection mythology disclosed herein can be utilized in various other applications where a precise peak position within an analog signal needs to be determined based on the digitally sampled data of the analog signal. As shown above, PRML detection in combination with further digital filtering and predictive calculation based on a mathematical model can prove to be particularly useful in such a task.

This invention has been described and specific examples of the invention have been portrayed. While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. Therefore, to the extent there are variations of the invention, which are within the spirit of the disclosure or equivalent to the inventions found in the claims, it is the intent that this patent will cover those variations as well. Finally, all publications and patent applications cited in this specification are herein incorporated by reference in their entirety as if each individual publication or patent application were specifically and individually put forth herein.

What is claimed as new and desired to be protected by Letters Patent of the United States is:

1. A magnetic servo position demodulator comprising:
 a transducer operable to detect first and second reference marks on a magnetic medium;
 a PRML detector connected to the transducer; and
 a first digital filter and a second digital filter coupled to the PRML detector, the first and second digital filters operable to provide information regarding a position of the first reference mark and a position of the second reference mark, respectively, on the magnetic medium, wherein the first reference mark comprises a first synchronization mark and the second reference mark comprises a second synchronization mark, the second digital filter further adapted to modify a position of the second synchronization mark as determined by the PRML detector.

2. The magnetic servo position demodulator according to claim 1, wherein the second digital filter comprises a mathematical model operable to generate information for determining the position of the second reference mark.

3. The magnetic servo position demodulator according to claim 2, wherein the mathematical model is derived from an interpolation equation.

4. The magnetic servo position demodulator according to claim 2, wherein the second digital filter further comprises an error filter.

5. The magnetic servo position demodulator according to claim 4, wherein the error filter comprises a square absolute error metric.

6. The magnetic servo position demodulator according to claim 4, wherein the mathematical model is derived from a Lagrange interpolation equation.

7. The magnetic servo position demodulator according to claim 2, wherein the second digital filter further comprises a peak detector.

8. The magnetic servo position demodulator according to claim 1, wherein the PRML detector comprises an analog to digital converter and a state machine.

9. The magnetic servo position demodulator according to claim 8, wherein the PRML detector is configured to detect partial response targets.

10. The magnetic servo position demodulator according to claim 9, wherein the partial response targets comprise PR4 targets.

11. The magnetic servo position demodulator according to claim 9, wherein the state machine operates by locating the most probable path through a state space formed by the partial response targets.

12. The magnetic servo position demodulator according to claim 1, further comprising:
 a circuit operable to calculate a position of the transducer relative to the magnetic medium based on the first and the second synchronization marks.

13. The magnetic servo position demodulator according to claim 12, further comprising:
 an actuator operable to displace the transducer based on the calculated position of the transducer.

14. The magnetic servo position demodulator according to claim 1, wherein the second digital filter calculates an estimated error of the position of the second synchronization mark as determined by the PRML detector, the estimated error being utilized to modify the position of the second synchronization mark as determined by the PRML detector to a new position closer to an actual position of the second synchronization mark.

15. The magnetic servo position demodulator according to claim 14, wherein the transducer is adapted to read a plurality of channels on the magnetic medium.

16. The magnetic servo position demodulator according to claim 15, wherein the magnetic medium comprises a magnetic data storage tape.

17. The magnetic servo position demodulator according to claim 1, wherein the first synchronization mark is contained in a base tone on the magnetic medium, and the second synchronization mark is out of phase with the base tone.

18. The magnetic servo position demodulator according to claim 17, wherein the second synchronization mark is constructed on the magnetic medium using patterns that are even sub-harmonics of the base tone.

19. A method of determining reference marks on a magnetic medium comprising:
    detecting a first synchronization mark on the magnetic medium in a synchronous fashion; and
    detecting a second synchronization mark on the magnetic medium in an asynchronous fashion, wherein the detecting the first synchronization mark comprises PRML detection and the detecting the second synchronization mark comprises PRML detection in combination with an error adjustment.

20. The method according to claim 19, further comprising:
    utilizing the first and the second synchronization marks to determine a position of a magneto-resistive head relative to the magnetic medium, wherein the magneto-resistive head is operable to read data stored on the magnetic medium.

21. The method according to claim 20, wherein the magnetic medium comprises a magnetic tape.

22. The method according to claim 19, further comprising:
    measuring a magnetic flux on the magnetic medium with a transducer.

23. A method of determining reference marks on a magnetic medium comprising:
    detecting a first synchronization mark on the magnetic medium in a synchronous fashion; and
    detecting a second synchronization mark on the magnetic medium in an asynchronous fashion, wherein the detecting the second synchronization mark comprises calculating an approximate position of the second synchronization mark and utilizing an interpolation to determine a final position of the second synchronization mark.

24. The method according to claim 23 wherein the interpolation comprises Lagrange interpolation.

25. The method according to claim 23 wherein the calculating the approximate position of the second synchronization mark comprises utilizing a square absolute error calculation.

26. A method of determining reference marks on a magnetic medium comprising:
    detecting a first synchronization mark on the magnetic medium in a synchronous fashion; and
    detecting a second synchronization mark on the magnetic medium in an asynchronous fashion, wherein the first synchronization mark is detected in a base tone on the magnetic medium.

27. The method according to claim 26 wherein a phase position of the second synchronization mark relative to a phase position of the base tone is unknown.

28. The method according to claim 27 wherein the detecting the second synchronization mark comprises calculating a variability of a position of the second synchronization mark relative to the base tone.

29. The method according to claim 28 wherein the detecting the second synchronization mark comprises interpolating a plurality of data sample points which are phase locked with the base tone, and calculating an offset of the position of the second synchronization mark relative to the base tone.

30. An apparatus for detecting a reference mark comprising:
    a transducer operable to read information recorded on a data storage medium;
    an analog to digital converter operable to covert an analog signal from the transducer into a digital data stream;
    a first digital filter operable to detect the reference mark in the digital data stream; and
    a second digital filter operable to refine a detected position of the reference mark, wherein the first digital filter comprises a state machine.

31. The apparatus according to claim 30, wherein the analog to digital converter and the first digital filter are configured as part of a PRML detector.

32. The apparatus according to claim 31, wherein the PRML detector is configured to detect PR4 targets.

33. The apparatus according to claim 30, wherein the second digital filter comprises a peak detector.

34. The apparatus according to claim 33, wherein the second digital filter further comprises a mathematical prediction model.

35. The apparatus according to claim 34, wherein the mathematical prediction model comprises an interpolation equation.

36. The apparatus according to claim 35, wherein the data storage medium comprises a magnetic medium.

37. The apparatus according to claim 36 wherein the analog to digital converter and the first digital filter are configured as part of a PRML detector.

38. The apparatus according to claim 30, wherein the transducer is operable to read a plurality of channels on the data storage medium.

39. The apparatus according to claim 38, wherein the transducer comprises a magneto-resistive sensor.

40. The apparatus according to claim 30 wherein the second digital filter comprises a detector for determining an approximate position of a peak, which represents the position of the reference mark, within an analog signal generated by the transducer.

41. The apparatus according to claim 40 wherein the second digital filter further comprises a mathematical prediction model configured to determine a more precise position of the reference mark relative to the approximate position of the peak.

* * * * *